US010810617B2

(12) United States Patent
Basu et al.

(10) Patent No.: US 10,810,617 B2
(45) Date of Patent: Oct. 20, 2020

(54) LOCAL DIGITAL DISPLAY ASSEMBLY AND DIGITAL CONTENT BROADCAST NETWORK COMPRISING SUCH ASSEMBLIES

(71) Applicant: JCDecaux SA, Neuilly sur Seine (FR)

(72) Inventors: Anirvan Basu, Paris (FR); Ludovic Bertrand, Breval (FR)

(73) Assignee: JCDecaux SA, Neuilly sur Seine (FR)

( * ) Notice: Subject to any disclaimer, the term of this patent is extended or adjusted under 35 U.S.C. 154(b) by 135 days.

(21) Appl. No.: 16/244,738

(22) Filed: Jan. 10, 2019

(65) Prior Publication Data

US 2019/0213631 A1 Jul. 11, 2019

(30) Foreign Application Priority Data

Jan. 10, 2018 (FR) ...................................... 18 50208

(51) Int. Cl.
*G06Q 30/02* (2012.01)
(52) U.S. Cl.
CPC ..... *G06Q 30/0252* (2013.01); *G06Q 30/0251* (2013.01); *G06Q 30/0261* (2013.01); *G06Q 30/0269* (2013.01)
(58) Field of Classification Search
None
See application file for complete search history.

(56) References Cited

U.S. PATENT DOCUMENTS

| 7,921,036 | B1 | 4/2011 | Sharma |
| 2003/0046158 | A1 | 3/2003 | Kratky |
| 2003/0088832 | A1* | 5/2003 | Agostinelli ............ G06Q 99/00 715/273 |
| 2006/0089870 | A1 | 4/2006 | Myhr |
| 2014/0379477 | A1* | 12/2014 | Sheinfeld ........... G06Q 30/0251 705/14.58 |
| 2016/0379251 | A1* | 12/2016 | Sanjay ................... G06Q 50/01 705/14.53 |

FOREIGN PATENT DOCUMENTS

FR 2906628 A1 4/2008

OTHER PUBLICATIONS

Hyun et al., Standardizations and considerations on P2P-based contents distribution for digital signage service, 2015, Proceedings of the 2015 17th international conference on advanced communication technology (ICACT), pp. 490-493 (Year: 2015).*
French Search Report related to Application No. 18 50208 dated May 28, 2018.

* cited by examiner

*Primary Examiner* — John Van Bramer
(74) *Attorney, Agent, or Firm* — Miller, Matthias & Hull LLP

(57) ABSTRACT

Local digital display assembly comprising several digital display devices located near each other and audience detection devices. The digital display devices are controlled depending on information provided by the audience detection devices.

27 Claims, 8 Drawing Sheets

LOCAL DIGITAL DISPLAY ASSEMBLY AND DIGITAL CONTENT BROADCAST NETWORK COMPRISING SUCH ASSEMBLIES

CROSS-REFERENCE TO RELATED APPLICATION

This application claims priority under the Paris Convention to French Patent Application No. 18 50208 filed on Jan. 10, 2018.

FIELD

The present description relates to local digital display assemblies and digital content broadcast networks (local or wide area) comprising such assemblies.

More specifically, the present description relates to a local digital display assembly comprising several digital display devices located near each other, intended to be seen by members of the public, and each comprising at least one digital screen and one central unit comprising a screen control module able to have the digital screen display digital content.

BACKGROUND

The document US 2013/0151656 describes an example of such a display assembly.

SUMMARY

Local digital display assemblies of this type are provided for repetitively playing content playlists, with modifying as appropriate the content playlist according to local ambient conditions.

The goal of the present description is in particular to adapt in real time or near real time the operation of the local digital display assembly to the audience detected in order to maximize the impact on the audience, and to do so without requiring additional bandwidth for communicating with one or more remote servers and by using the limited calculation capacities of the usual digital display devices.

For this purpose, a local digital display assembly is proposed of the type in question in which said local digital display assembly (E) further comprises devices for audience detection able to gather information about people located near the digital display devices, and the local digital display assembly further comprises a local supervisory system (i.e. an edge supervisory system) suited for:

based on collected information, determining in real time at least one crowd characteristic representative of a collective behavior of the people located near the digital display devices, where said at least one crowd characteristic is chosen among a crowd density and a crowd movement speed; and controlling the respective screen control modules of the digital display devices depending on said at least one crowd characteristic, where said local supervisory system is able to determine in real time the digital content to have respectively the digital display devices display depending on said at least one measured crowd characteristic;

wherein the local supervisory system comprises supervisory modules belonging respectively to the central units of several display devices of the digital display assembly, where the supervisory modules communicate with each other by a peer to peer communication protocol;

and where said local supervisory system comprises artificial intelligence distributed over said supervisory modules, which is able to determine said at least one crowd characteristic by a calculation distributed among said supervisory modules by the peer to peer communication.

In this way, the adaptation to the audience and possibly the interaction with a detected crowd can be done locally, very responsively, independently of the bandwidth available for communicating with one or more remote servers.

Further, with this configuration, individual data which could come from the audience detection devices can be processed solely locally, while preserving in that way the privacy of the individuals making up the audience.

In various embodiments of the local digital display assembly, use could further be made of one and/or the other of the following dispositions:

Said local supervisory system is able to determine several crowd characteristics including the crowd density, the crowd movement speed, a crowd movement direction and a proximity of the crowd to at least one of the digital display devices;

Said local supervisory system is able to receive external data from at least one remote resource and for controlling the respective screen control modules of display devices depending on said external data;

Said external data comprise meteorological data;

Said external data comprise mobile phone data provided by mobile phone operators on the location and use of mobile terminals;

Said external data comprise geolocalized data coming from social networks;

Said audience detection device comprises at least one detector chosen among a camera, WiFi interface, NFC interface, Bluetooth® interface, radar detector, and passage detector;

The camera is chosen among a motion detection camera (in particular an infrared camera), a 360° camera and a 3D camera;

At least one of the digital display devices comprises an input interface with which a member of the public can control said digital display device;

Said input interface is chosen among a touch interface and a radio communication interface allowing an interaction with a mobile phone used by said member of the public;

Each digital display device is able to operate:

Either in normal mode where said digital display device displays digital content chosen among a first group of content;

Or a crowd interaction mode where said digital display device displays at least one preemptive digital content chosen among a second group of content, said local supervisory system being able to have at least one of the digital display devices (2) from the local digital display assembly operate in crowd interaction mode when a crowd is identified;

The local supervisory system is able to determine in real time at least the crowd density, and the local supervisory system is able to have at least one of the digital display devices operate in crowd interaction mode when the local supervisory system detects a crowd density over a minimum density in the area of said at least one digital display (2) after a period of operation in normal mode;

Said local supervisory system is further able to determine in real time at least the crowd speed, and the local supervisory system is able to have at least one of the digital display devices operate in crowd interaction mode when said local supervisory system detects a crowd density over a minimum density and a crowd speed under a maximum speed in the area of said at least one digital display after a period of operation in normal mode;

The local supervisory system is further suited for determining in real time at least a proximity of the crowd relative to each digital display device in the local digital display assembly, and the local supervisory system is able to determine, in said local digital display assembly, at least one digital display device closest to the crowd and to have said at least one digital display device closest to the crowd operate in crowd interaction mode;

The crowd detection device is able, depending on said direction of movement of the crowd and said proximity of the crowd to each digital display device from the local digital display assembly:
  to determine, within said local digital display assembly, one digital display device best able to draw the crowd in a desired direction;
  and to have said digital display device operate in crowd interaction mode;

When the local supervisory system makes at least one of the digital display devices operate in crowd interaction mode, said local supervisory system continuously analyzes the behavior of the audience and goes through several successive predetermined phases depending on said behavior of the audience for progressively increasing the influence thereof on the crowd;

Said local supervisory system is able: when the local supervisory system goes into crowd interaction mode, to go into a first phase in which said local supervisory system has geolocalized data coming from social networks corresponding to a location of said local digital display assembly displayed on said at least one digital display device;

Said local supervisory system is able: when the local supervisory system is in the first phase of crowd interaction mode, to determine whether the audience satisfies at least one audience targeting criterion indicating that the audience is targeted and in the affirmative, to go into a second phase in which said local supervisory system has targeted content corresponding to the audience displayed on said at least one digital display device;

Said local supervisory system is able: when said local supervisory system is in the second phase of crowd interaction mode, to determine whether the audience satisfies at least one interactive criterion indicating that the audience is ready to interact with at least one digital display device and in the affirmative, to go into a third phase in which said local supervisory system has at least one simple interactive content displayed on said at least one digital display device;

Said local supervisory system is able: when the local supervisory system is in the third phase of crowd interaction mode, to determine whether the audience satisfies at least one domination criterion indicating that the audience is ready to let itself be directed by at least one digital display device and in the affirmative, to go into a fourth phase in which said local supervisory system has at least one personalized interactive content chosen by the at least one audience member displayed on said at least one digital display device;

Said local supervisory system is able: when the local supervisory system is in the third phase or in the fourth phase of the crowd interaction mode to have at least one other of the digital display devices display said targeted content such as defined above on;

The crowd detection device is able to return all digital display devices of said local digital display assembly to operation in normal mode when the crowd moves farther than a maximum distance away from each digital display device of said local digital display assembly after a time operating in crowd interaction mode.

Further, an object of the present description is also a digital content broadcast network comprising at least one first local digital display assembly according to what was defined above and one second local digital display assembly as defined above, where the local supervisory systems of the first and second local digital display assemblies communicate with each other and are able to:
  when the local supervisory system of the first local digital display assembly returns all the digital display devices of said first local digital display assembly to operation in normal mode and detects that the crowd is moving towards the second local digital display assembly, to determine a digital display device within the second local digital display assembly best able to capture the attention of the crowd and/or to draw in the crowd;
  and to have said digital display device of the second local digital display assembly operate in crowd interaction mode.

An object of the present description is also a digital content broadcast network comprising at least one local digital display assembly as defined above and at least one remote server (identified server(s) or cloud), wherein the local supervisory system of the local digital display assembly comprises artificial intelligence suited for at least determining in real time the digital content to have respectively the digital display devices display depending on said at least one measured crowd characteristic, where the local supervisory system of said local digital display assembly is able to communicate to said at least one remote server information about the operation in crowd interaction mode of said local digital display assembly, and where said at least one remote server comprises at least one machine learning module able to enrich the artificial intelligence of the local supervisory system depending on said information about the operation in crowd interaction mode from said local digital display assembly. The artificial intelligence of the local supervisory system could comprise a set of heuristic rules and said at least one remote server is able to improve said set of heuristic rules by adapting the pre-existing heuristic rules and/or by creating new heuristic rules added to said heuristic rules set.

BRIEF DESCRIPTION OF THE DRAWINGS

Other features and advantages will become apparent during the following description of one embodiment, given as a nonlimiting example, with reference to the attached drawings.

In the drawings.

DETAILED DESCRIPTION

In the various figures, the same references designate identical or similar items.

Figure 1:
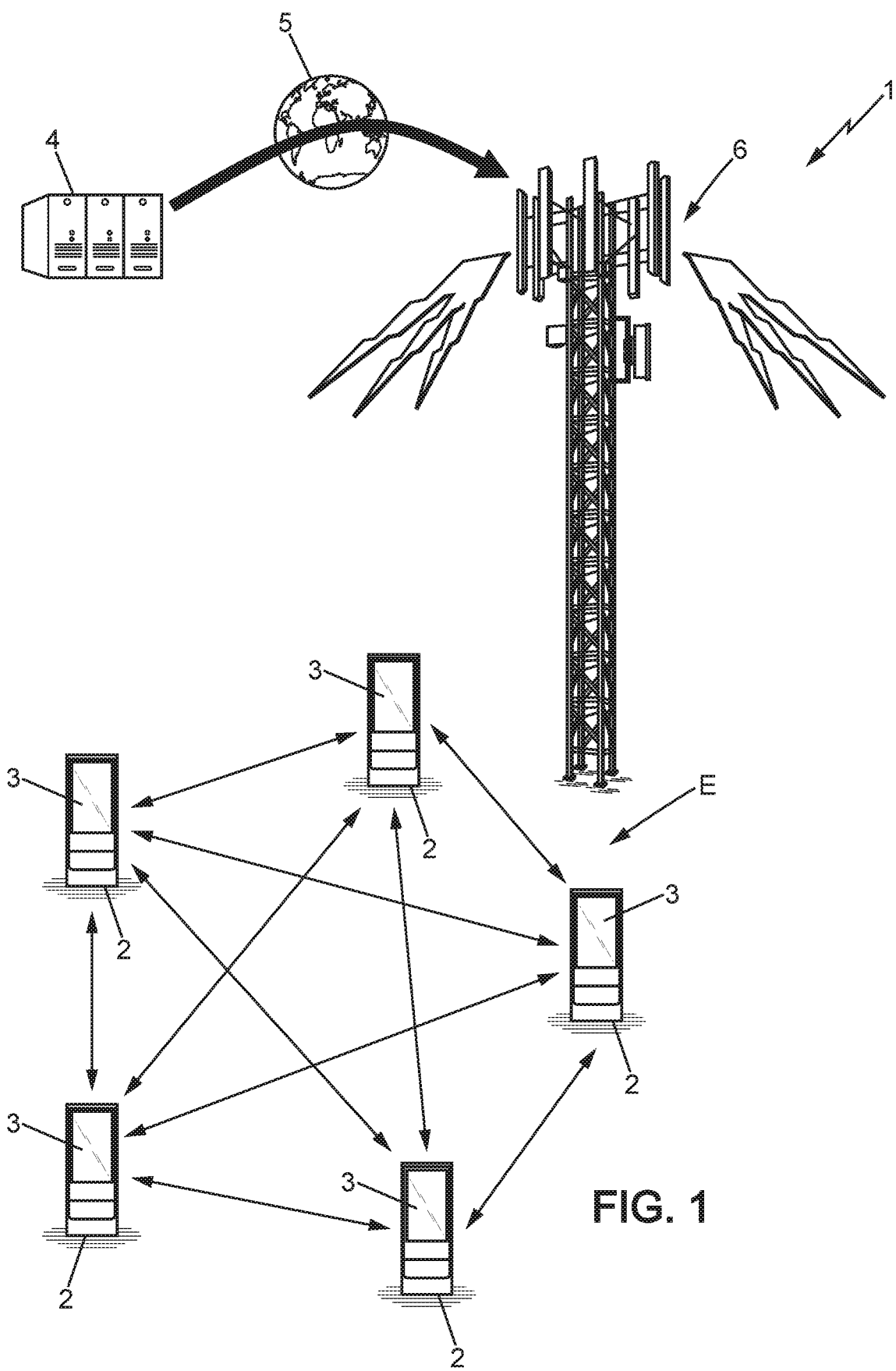
FIG. 1 is a partial schematic view of a digital content broadcast network according to an embodiment.

FIG. 1 shows a digital content broadcast network 1 comprising a plurality of digital display devices 2, each comprising a digital screen 3. Screen 3 could be tactile, for at least some of the digital display devices 2.

The digital content in question can comprise in particular videos and/or fixed images, but also interactive or other games.

This digital content can be sent to the digital display devices 2 from at least one remote server 4, by any wide-area network ("WAN"), in particular by the Internet 5. The wide area network could comprise one or more radio links 6 (for example LTE or other standard) to some or all of the digital display devices 2.

The digital display devices 2 can be arranged in particular in public spaces, meaning any area accessible to the public such as public streets, train stations, airports, malls, etc. They can be distributed over a wide area, for example a city.

The digital display devices 2 can be gathered in local digital display assemblies E, comprising a few digital display devices 2, for example from 2 to 10, distributed over a relatively small geographic extent, in particular within a radius of several tens to several hundreds of meters, for example under 500 m.

The digital display devices 2 first single local digital display assembly E can communicate with each other via local network, for example Wi-Fi or LoRa. Advantageously, the digital display devices 2 of a single local digital display assembly E can communicate with each other according to a peer to peer (P2P) protocol as shown in FIG. 1 by the arrows between digital display devices 2. The peer to peer protocol in question can for example be the "Whisper" protocol, or other.

The digital display devices 2 for a single local digital display assembly E together form a distributed and decentralized computer architecture known under the name of "edge computing" or data processing at the edge of the network, meaning near data sources.

Figure 2:
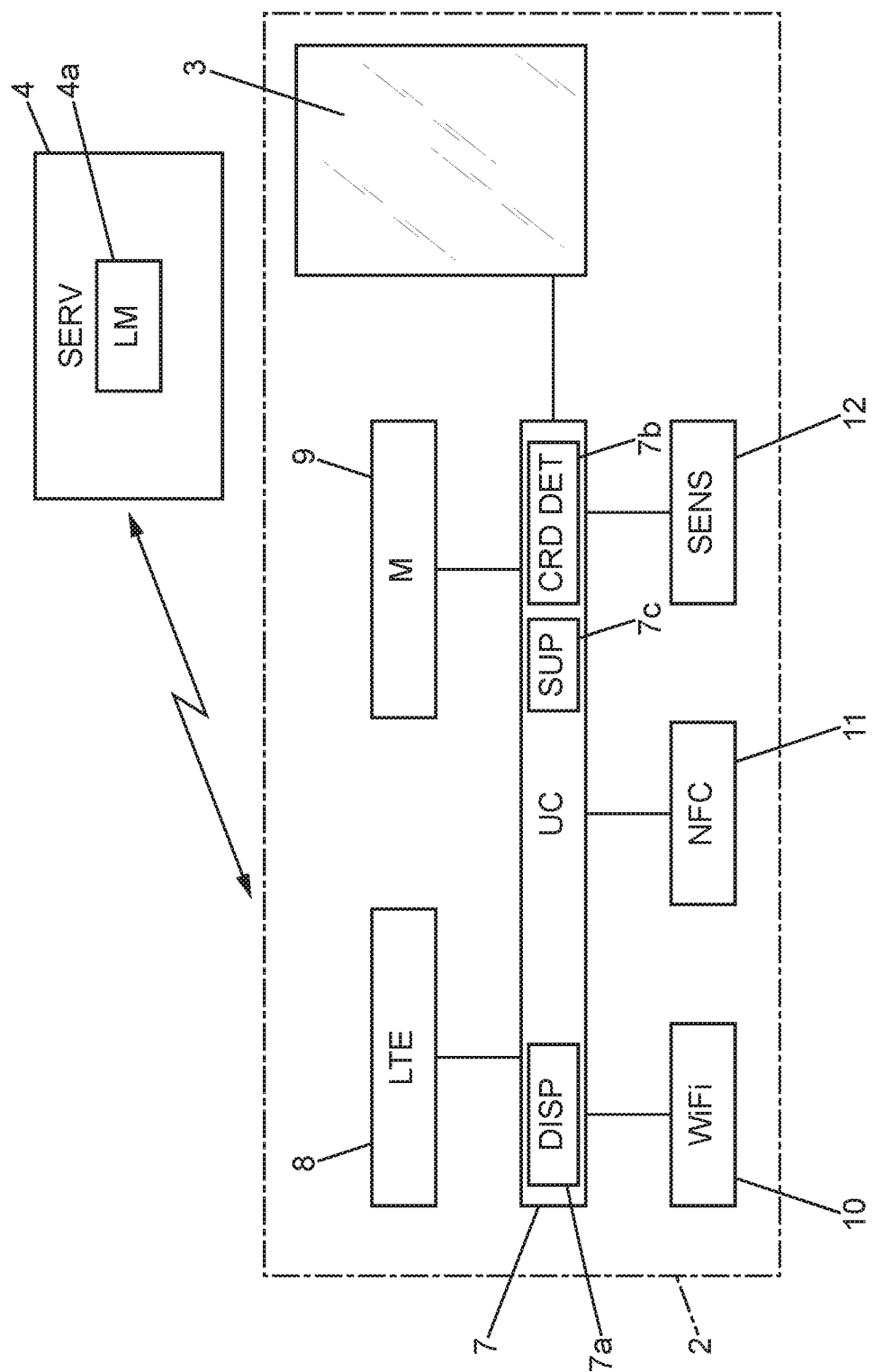
FIG. 2 is a block drawing of a digital display device belonging to the network from FIG. 1.

As shown in FIG. 2, each digital display device 2 can in particular comprise at least one central unit 7 (CU) such as a digital screen control processor 3, a communication interface 9 (LTE or other modem) able to communicate with a wide area network 5, 6, and mass storage 9 (M) for storing digital content.

The central unit 7 is able to communicate with the server 4 for receiving digital content to be displayed and for storing it in memory 9.

In particular, the memory 9 contains at least one digital content playlist to have the screen 3 display and the central unit 7 is programmed to automatically have the digital screen 3 display the digital content from this playlist (the playlist of digital content can in particular be played in a loop on the digital screen 3). The digital content playlist can be received from the server 4 already formed, or else can be determined by the central unit 7 depending in particular on predefined criteria, from the digital content set received from the server 4.

More specifically, the central unit 7 executes a screen control software module 7a (DISP) which is able to communicate with the server 4, which could determine the digital content playlist to have the digital screen 3 display and which controls the digital screen 3.

The aforementioned digital content playlist makes up a first group of digital content intended to be displayed in a normal operating mode of the digital display device 2 (generally, this normal mode is a sequential display of predefined content contained in a playlist).

Further, the digital display device 2 comprises at least one communication interface 10, for example a radio communication interface (in particular Wi-Fi or other), with which the digital display devices 2 can communicate together as explained above, and/or for communicating, for example by Bluetooth®, with at least one member of the public having a mobile terminal such as a "smart phone", "smart pad" or other. This communication interface 10 can be controlled by the aforementioned central unit 7 or by another electronic central unit connected to said central unit 7.

The digital display device 2 comprises an audience detection device able to gather information about people located near the digital display device 2 (or about vehicles transporting these people).

The audience detection device can for example comprise at least one detector, in particular:

at least one detector 11 operating by interaction with the mobile terminals of members of the public, for example a WiFi interface, a long-range NFC interface and/or other long-range RFID interface and/or a Bluetooth® interface;

and/or a detector 12 (SENS) able to detect people, for example a motion detection camera (in particular infrared) and/or a radar detector and/or a passage detector or other.

These examples of detectors have the advantage of being able to be used without taking an image with which to identify members of the public, which is in particular useful when this rule is imposed by national legislation.

As a variant, when allowed by national legislation (which is made more likely by purely local processing of the audience detection data coming from the detectors 12), and in particular for internal applications, the detector 12 can be a camera operating in the visible spectrum, for example a 360° camera and or a 3D camera.

The aforementioned one or more detectors 11, 12 can send their information to an audience detection software module 7b (CRD DET) of the digital display device 2, which can for example be executed on the aforementioned central unit 7 or on another electronic central unit communicating with said central unit.

The local digital display assembly E further comprises a local supervisory system, comprising supervisory software modules 7c (SUP) running respectively on the central units 7 of the various digital display devices. The local supervisory system is able to control the respective screen control modules 7a of the digital display devices 2 depending on audience data coming from the audience detection module 7b. More specifically, this local supervisory system is able:

to determine in real time based on collected audience information at least one crowd characteristic representative of a collective behavior of people located near the digital display devices 2;

to determine in real time the digital content to have the digital display devices 2 display respectively depending on said at least one crowd characteristic.

Said at least one crowd characteristic determined by the local supervisory system can include at least one crowd density and one crowd movement speed, in particular a movement speed of the center of gravity of the crowd.

The local supervisory system is able to determine in real time several characteristics of the crowd comprising, for example:
the crowd density;
the crowd movement speed (magnitude of the movement velocity vector) and a crowd movement direction (therefore, together, the crowd movement velocity vector);
And a proximity of the crowd to the digital display device 2 (in particular distance and direction of the "center of gravity" of the crowd from the digital display device 2).

In particular, the local supervisory system is able to have at least one digital display device 2 of the local digital display assembly E operate in a crowd interaction mode when a crowd is identified by the local supervisory system, possibly under certain conditions that the local supervisory system can receive, for example, from the aforementioned remote server 4. In this crowd interaction mode said digital display device 2 displays at least one preemptive digital content chosen among a second group of content, distinct from the aforementioned first group of content. The one or more contents from the second group of content can comprise, for example, interactive games, content coming from social networks (in particular Twitter, Instagram, Facebook or others), or even questionnaire games (quizzes) in particular related to the advertising content.

The supervisory modules 7c of the various digital display devices 2 of the assembly E communicate with each other, in particular by a peer to peer communication protocol as described above.

More generally, the audience detection devices can also be distinct from the digital display devices 2, and communicate by local area network with said digital display devices 2 by peer to peer communication (P2P).

Beyond the locally determined crowd characteristics, the local supervisory system can also be able to receive outside data from at least one remote resource, in particular at least one remote server 4 or another server (which could be in the cloud), in particular to control the respective screen control modules 7a of the display devices depending on said external data and/or have some of these external data displayed.

The external data in question can comprise, for example:
meteorological data;
mobile phone data (in particular past statistics) provided by mobile phone operators on the location and use of mobile terminals; and
geolocalized data coming from social networks.

The local supervisory system comprises artificial intelligence distributed over the respective supervisory modules 7c of the various digital display devices. This artificial intelligence distributed over the supervisory modules 7c ("swarm intelligence") may comprise at least one neural network that is able to determine said at least one crowd characteristic by a calculation distributed among said supervisory modules by the peer to peer communication. Said at least one neural network may have several layers (e.g. 5 layers) and can be a deep learning type. To be able to be operated on a group of processor of little capacity as those of said central units 7, the neural network may be a compressed deep neural network, with 60-80% of the capacity which would be available on an elaborated deep neural network, operated on a single powerful processor equipped with one or several GPUs. This distributed artificial intelligence can operate in distributed mode according to a consensus protocol ("consensus-based approach") between the supervisory modules 7c.

The digital content broadcast network 1 can further comprise at least one machine learning software module 4a (LM, see FIG. 2), for example on the remote server 4 and/or on another server, for example in the cloud. In this case, the local supervisory systems for the local digital display assemblies E communicate information on the operation and crowd interaction mode of said local digital display assemblies to said machine learning module 4a and the machine learning module processes this information (generally in non-real time) for enriching the artificial intelligence of the local supervisory systems of said local digital display assemblies. The machine learning software module 4a can be an artificial intelligence module comprising, for example, at least one neural network, in particular with deep learning and in particular deep neural network type.

More precisely, artificial intelligence of the local supervisory system could comprise a set of heuristic rules and the machine learning module 4a is able to improve said set of heuristic rules by adapting the pre-existing heuristic rules and/or by creating new heuristic rules that it adds to said heuristic rules set. At the first start-up of the artificial intelligence of the local supervisory system, a set of heuristic rules and cause-and-effect relationships are loaded from the machine learning module 4a. As long as the crowd characteristics and external conditions correspond to these initial rules, the artificial intelligence works well. When new external conditions or crowd characteristics appear, the heuristic rules are adapted by the machine learning module, which can in particular adjust artificial intelligence "hyperparameters" for adapting the existing rules or adding new ones.

For this purpose, the machine learning module 4a can comprise two different types of auto-encoders stacked several levels deep, in the form of convolutional neural networks ("Convolutional Deep Learning Networks"):
Reinforcement Learning auto-encoders with "evolution strategies": neural networks can adapt existing rules with this learning method. "Evolution strategies" are a form of reinforcement learning which use a small number of hyperparameters for rule development. The calculations are therefore quicker than for other algorithms such as Q-Learning.
Learning auto-encoder based on a state representation ("Representation Learning") using LSTM ("Long Short-Term Memory") for creating new rules ("rule mining"). LSTM modules are widely used in the language processing field and are used here for discovering new rules and strategies based on the crowd characteristics and abstract characteristics.

The functionalities of the artificial intelligence of the supervisory system can be the following:
1. Analysis of the Audience and Determination of the Crowd Characteristics:

The supervisory system analyzes the audience data coming from various detectors 10-12 (including fixed or moving images coming from cameras) in order to estimate crowd characteristics, in particular density, proximity (distances from digital display devices 2), and velocity.

If the results of the analysis correspond to the conditions for starting crowd interaction operating mode (preemptive campaign), the supervisory system determines selects a preselected content playlist and the preemptive content to be displayed from the second content group. In this determination, external parameters can be considered by the supervisory system, such as time, meteorological conditions, and events underway near the digital display assembly E. This analysis is done continuously, such that the preselected content playlist can be updated frequently.

The level of intelligence required for this first functionality is that of the brain of a lower mammal (quick instinctive reaction in response to quickly changing stimuli).

2. Analysis of the Crowd: Profile and Characteristics of Feelings:

This functionality requires advanced analyses and the combination of abstract and high-level characteristics. This functionality is automatically activated when at least one of the campaigns requires preemptive characteristics. The supervisory system analyzes data from the aforementioned detectors (e.g. binary data, measurements, images) for identifying one or more principal collective profiles of the crowd based on demographic analysis (for example, sex, socioprofessional category, etc.), and estimating the principal feelings thereof (for example: happy, sad, tired, thirsty, busy, festive, etc.). In the present application, "feeling" is used as a synonym for "mood".

Generally, the demographic data and the characteristics of feelings, if they are identified and isolated as main component, remain fairly stable over some time, for example from 15 minutes to one hour depending on context. The intelligence required for this functionality is that of the brain of a higher mammal, having the capacities:

to identify abstract characteristics such as the feelings of a crowd;

to merge and make high-level characteristics and/or multiple feelings correspond; and to reason non-linearly and conceive of a "strategy" for displaying "preemptive" advertising (capable of retaining the attention of the crowd) which correspond to the feelings of the crowd.

Because of these capacities, the artificial intelligence can conceive of a targeted advertising campaign strategy over some period, so long as the detected feelings last. The strategy can be modified according to the context and the physical and emotional characteristics of the crowd (for example, discreetly following the crowd with a sequence of advertisements, causing interaction with the crowd leading to the domination of the crowd, etc.).

The following examples show how the artificial intelligence of the supervisory system analyzes the crowd feelings by merging high-level audience information and low-level information of WiFi and/or Bluetooth® origin and environmental data.

Example 1: Detection of a Presence Threshold for iWatch®, iPhone-X® Type Wifi Devices →Main demographic="young urban tech savvy",
+external context: New York City, Times Square+evening (after 7 PM);
+crowd physical characteristics: high density, diffuse velocity,
+trends of Tweets and Instagram for this demographic: lifestyle, amusement, relaxation,
→Crowd feelings preemptive advertisements:
  1. Thirst→preemptive advertisement for beverages,
  2. Festive ("Party time")→preemptive advertisements for restaurants, going out for dinner, takeout,
  3. Romantic preemptive advertisements for technology gifts (e.g. watches, smart phones, connected mobile devices, etc.),
→Strategy: cause brief interactions on the touchscreen 3, relative to preemptive advertising context+continue by related advertisements on nearby screens.

Example 2: Detection of a Majority of Samsung Galaxy S10® Type Wifi Devices

→Main demographic: "Technology consumer, pragmatic and frugal"
("Tech savvy pragmatic")+external context: Canary wharf+lunchtime (noon to 2 PM),
+crowd physical characteristics: high density, high velocity (single speed+direction),
+trends of Tweets and Instagram for this demographic: Consumer Electronics Show Las Vegas, consumer technology products,
→Crowd feelings preemptive advertisements:
  1. Up-to-date with technologies ("tech aware")→preemptive advertisements for BMW® emphasizing technological features
  2. Lifestyle consumer→preemptive advertisements for Samsung® intelligent refrigerators, L'Oreal® connected brushes,
→Strategy: follow the crowd discreetly with localized programmatic publicity sequences in the area where similar crowd characteristics prevail.

Because the artificial intelligence is local and distributed over the supervisory modules 7c, it can adapt quickly to changes in external conditions and audience characteristics.

To manipulate the multiple crowd characteristics and the artificial intelligence, operations on tensors $X_i$, which represent features having multiple components, can be used.

For representation of a high-level sentiment $R_1$ involving for example three characteristics $X_1$, $X_2$, $X_3$, the tensor product is used:

$R_1: \rightarrow X_1 \otimes X_2 \otimes X_3$

The high-level merging of feelings (also called high-level merging of characteristics) can be represented by an operation of time (in the example of the merging of three feelings $R_1$, $R_2$, $R_3$ corresponding respectively to $X_1 \otimes X_2 \otimes X_3$, $X_4 \otimes X_5 \otimes X_6$, $X_7 \otimes X_9 \otimes X_9$):

$R_1 \oplus R_2 \oplus R_3: \rightarrow (X_1 \otimes X_2 \otimes X_3) \oplus (X_4 \otimes X_5 \otimes X_6) \oplus (X_7 \otimes X_8 \otimes X_9)$ The artificial intelligence used (supervisory modules 7c and machine learning module 4a) can also be adapted for nonlinear actions such as design of rules and strategies by using in particular modules based on weighted Directed Acyclic Graphs (wDAG). In these cases, the direct and indirect spatial causality of high-level feeling representations are analyzed and conclusions (e.g. new steps or strategies) are drawn from them.

Figure 3:
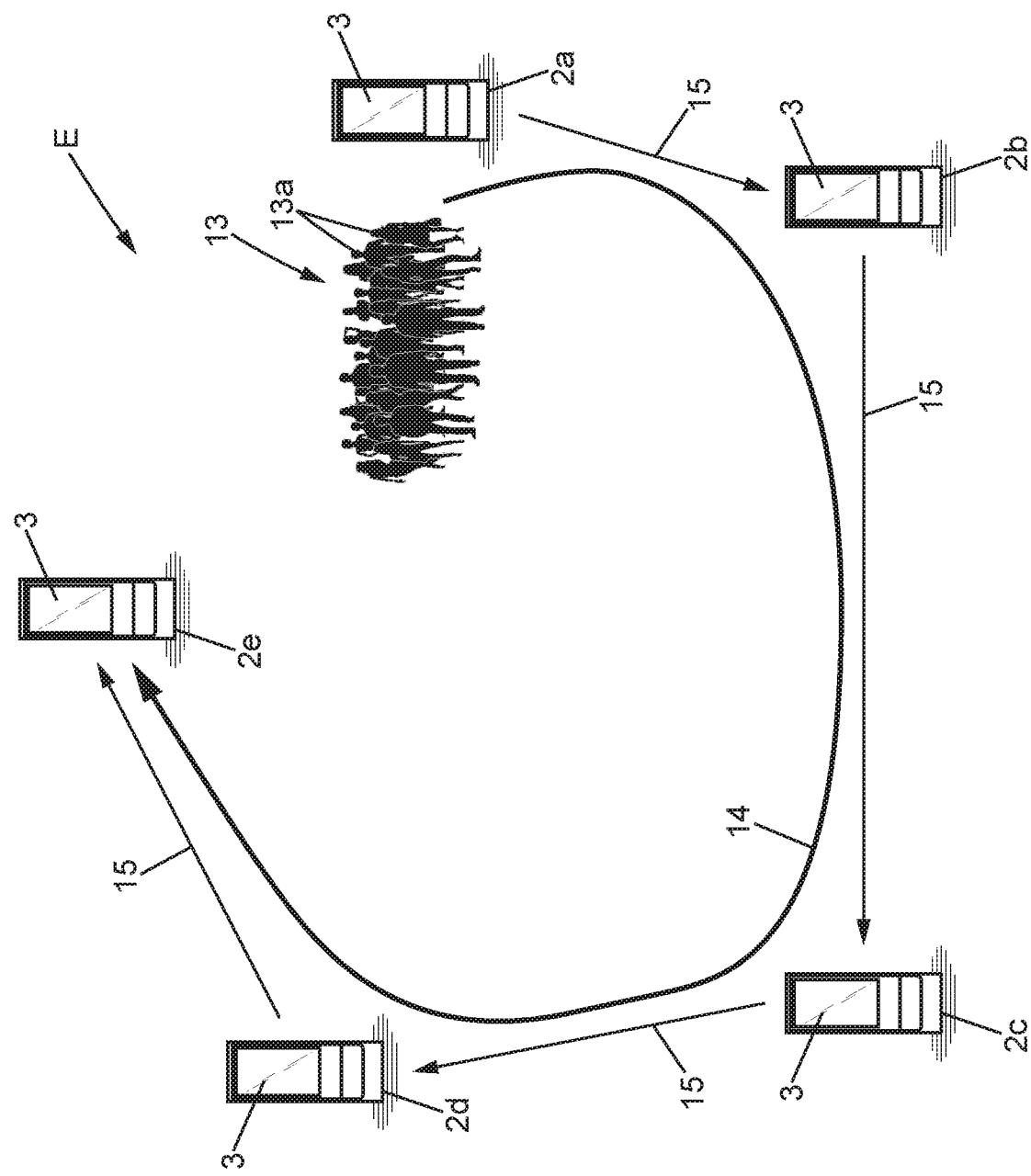
FIG. 3 is a view of a local digital display assembly example like the one shown in FIG. 1, during interaction with a crowd.

As shown in FIG. 3, the digital display assembly E can for example operate as follows.

In FIG. 3, the devices 2 are here labeled 2a to 2e to individually identify them, but they are identical or similar and all correspond to the previously described display device 2.

This description is made in the scenario where the local supervisory system is formed by supervisory modules 7c such as described above, but will be applicable, mutatis mutandis, to the case where the local supervisory system is on least one distinct local unit as described above.

When the local supervisory system detects the formation of a crowd 13 of people 13a, meaning a group of people having some collective behavior, near one of the digital display devices 2, for example the digital display device 2a from FIG. 3, the supervisory system can for example make this digital display device 2a operate in crowd interaction mode and make it display a preemptive content belonging to the second content group, generally specifically able to draw the attention of the crowd.

This crowd detection can in particular take place when the local supervisory system detects a crowd density over a minimum density in the area of said digital display device 2a, after a period of operation in normal mode of all the digital display devices 2 in the local digital display assembly.

The crowd detection criterion used by the supervisory module 7c can be more complex and can involve several measured crowd characteristics and/or some of the aforementioned external data.

For example, the crowd detection criterion may combine the crowd density as explained above with a crowd speed (magnitude) less than a maximum speed in the area of said digital display device 2, for avoiding detecting people moving quickly and only having a little interest in the content displayed, for example a crowd of people leaving the subway or other.

While the digital display device 2a displays content from the second group, the other digital display devices 2b-2e from the assembly E can possibly continue to operate in normal mode with content from the first content group, or in contrast one or more digital display devices neighboring the digital display device 2a can display other content from the second group.

Once the digital display device 2a has switched into crowd interaction operating mode, the supervisory modules 7c of the various digital display devices 2 collectively analyze the behavior of the crowd 13, in particular with their edge-distributed artificial intelligence.

In particular, the supervisory modules 7c of the various digital display devices 2 determine in real time which digital display device 2a-2e displays content from the second group.

For example, the supervisory modules 7c in the various digital display devices 2 continuously determine, among said local digital display assembly E, which one is the digital display device 2 closest to the crowd 13 (or the digital display device 2 the best one to draw the attention of the crowd 13) and makes said digital display device 2 closest to the crowd operate in crowd interaction mode. In the example from FIG. 3, if the crowd 13 moves in the direction of the arrow 14, then the supervisory modules 7c successively change the digital display device operating in crowd interaction mode so that it becomes display device 2b, then 2c, then 2d, then 2e, following the arrows 15, as the movement of the crowd 13 progresses.

As a variant, the supervisory modules 7c in the various digital display devices 2 continuously determine, among said local digital display assembly E, which one is the digital display device 2 the best able to draw the crowd in a desired direction and make said digital display device 2 operate in crowd interaction mode.

When the supervisory modules 7c of various digital display devices 2 from the local digital display assembly E determine that the crowd has dispersed or that it has left the radius of action of the assembly E (for example if the crowd has moved away from each digital display device 2 of said local digital display assembly E by more than a maximum distance), they return all digital display devices 2 of said local digital display assembly E to operation in normal mode after a period of operation in crowd interaction mode.

Figure 4:
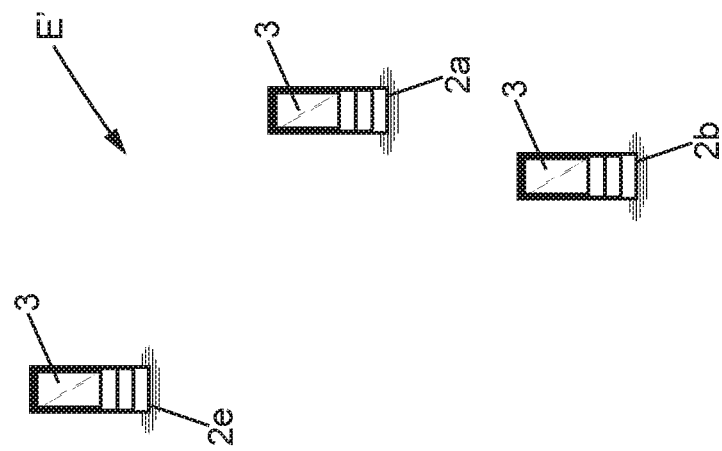
FIG. 4 shows an example of combined interaction of two local digital display assemblies with the crowd.
Figure 4:
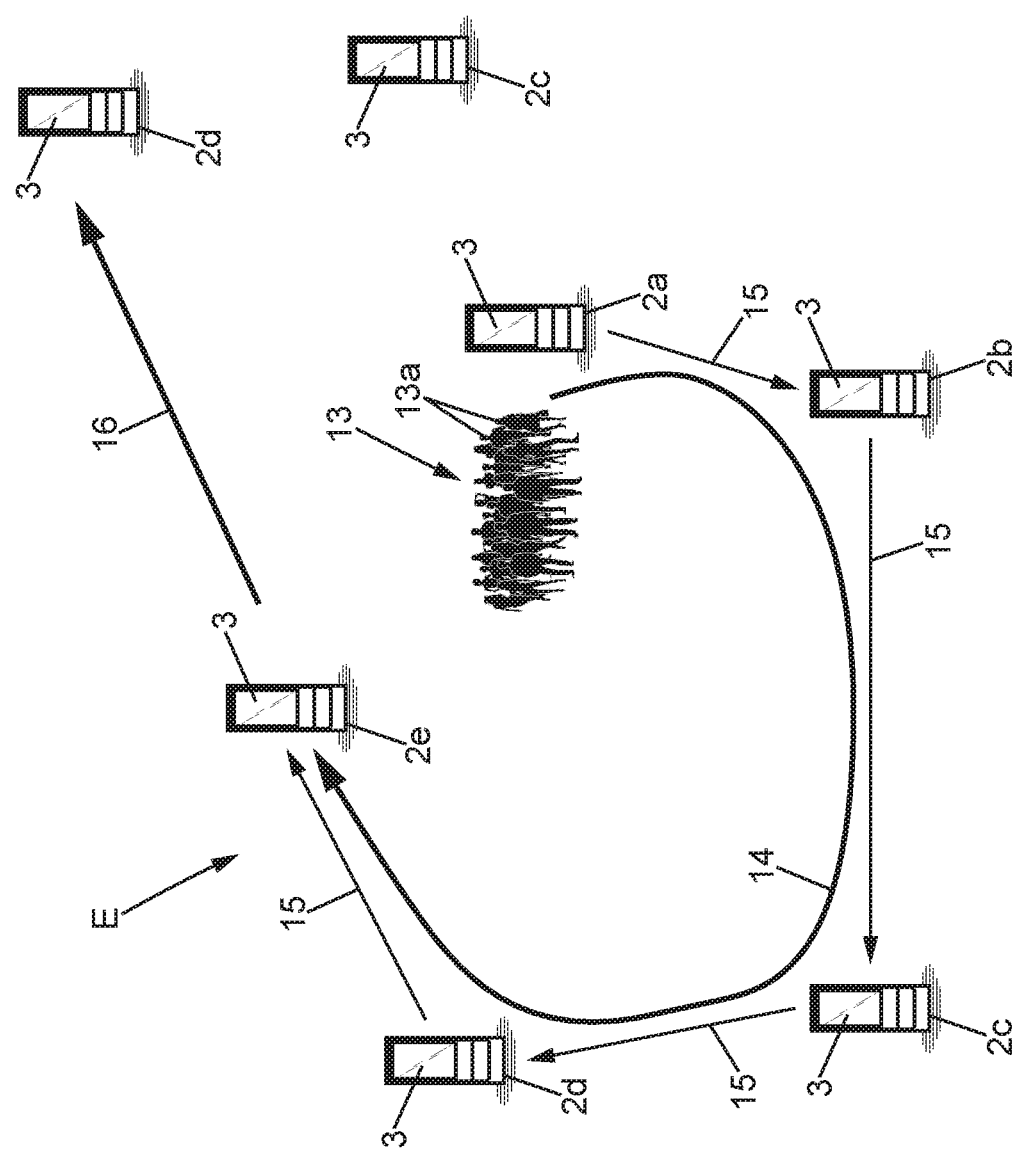

Possibly, as shown in FIG. 4, if the digital content broadcast network 1 comprises a digital display assembly E' near the assembly E, the local supervisory systems of the two local digital display assemblies E, E' can communicate with each other (by local area network and/or by wide area network 5, 6) so that, when the local supervisory system of the first local digital display assembly E returns all the digital display devices 2 of said first local digital display assembly E to operation in normal mode and the crowd moves towards the second local digital display assembly E', can determine a digital display device 2 from the second local digital display assembly E' best able to capture the attention of the crowd and/or drawing the crowd, and can make said digital display device 2 from the second local digital display assembly E operate in crowd interaction mode.

Figure 5:
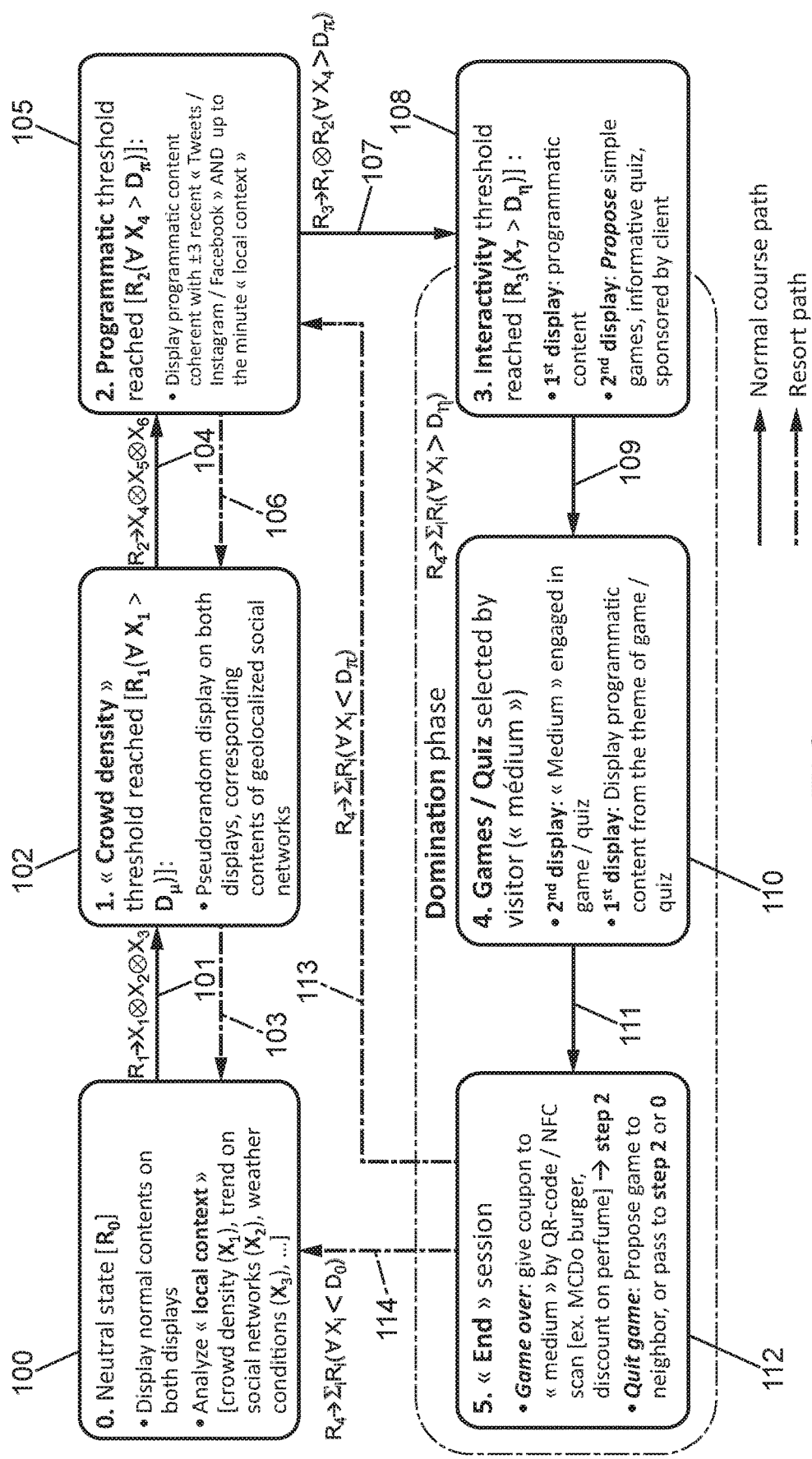
FIG. 5 shows an example of the process used by the digital display assemblies from FIGS. 3 and 4.

FIG. 5 shows a specific example of the process used in the assembly E comprising for example two digital display devices.

In this example, the artificial intelligence of the local supervisory system is initially in the neutral state $R_0$ (100), meaning that the digital display devices 2 are each operating in normal mode and displaying content from the first content group as previously explained.

In this state, the artificial intelligence continuously analyzes the local context, which can comprise for example three parameters: $X_1$ (for example crowd density), $X_2$ (trends on social networks), $X_3$ (meteorological conditions). As previously explained, this analysis can be done by determining a criterion (feeling) whose tensor is $R_1$: $\rightarrow X_1 \otimes X_2 \otimes X_3$ as previously defined.

When $R_1$ (in magnitude) exceeds some threshold $D_\mu$, the artificial intelligence goes into crowd interaction mode and starts to have the display devices 2 display content belonging to the second content group. The artificial intelligence continuously analyzes the audience behavior and goes through several predetermined successive phases depending on said audience behavior for progressively increasing the influence thereof over the crowd.

More specifically, the artificial intelligence of the supervisory system first enters (arrow 101) into a first phase 102 in which said artificial intelligence has geolocalized data coming from social networks corresponding to a location of said local digital display assembly E displayed on the digital display devices 2.

Said artificial intelligence continues to monitor the audience and determine for example a second criterion $R_2$ based on other parameters $X_4$, $X_5$, $X_6$ ($R_2$: $\rightarrow X_4 \otimes X_5 \otimes X_6$). If $R_1$ decreases below the threshold $D_\mu$, said artificial intelligence returns to the neutral state 100 (arrow 103).

When $R_2$ reaches some programmatic threshold $D_\eta$ (audience targeting criterion indicating that the audience is targeted), said artificial intelligence passes (arrow 104) into a second programmatic phase 105 in which said artificial intelligence has targeted content corresponding to the audience displayed on digital display devices 2. If $R_2$ returns below the programmatic threshold $D_\pi$, said artificial intelligence returns to the phase 102 (arrow 106).

When said artificial intelligence determines that the audience satisfies at least one interactive newness criterion indicating that the audience is ready to interact with at least one digital display device 2 (for example, depending on a criterion $R_3$ which is the merger of $R_1$ and $R_2$), said artificial intelligence passes (arrow 107) into a third phase 108 in which said artificial intelligence has one of the digital display devices 2 display at least one interactive content (e.g. game, questionnaire games ("quiz"), etc.), with the other device remaining in the operating mode with display of programmatic content.

Next, if said artificial intelligence determines that the audience satisfies at least one domination criterion indicating that the audience is ready to let itself be directed by at least one digital display device 2 (for example, a criterion $R_4$ must be over a threshold $D_n$, where $R_4$ is the merger of several feelings $R_i$ such as $R_1$, $R_2$, $R_3$ and/or others), said artificial intelligence moves (arrow 109) into a fourth phase 110 in which said artificial intelligence has a personal interactive content chosen by an audience member in particular by interaction with the screen 3 if it is tactile or with another interface (WiFi or Bluetooth® radio interface via the mobile phone of the person, interface actuated by hands without contact, etc.) on one of the digital display devices 2, where the other device 2 stays in programmatic mode. The personalized interactive content can in particular be a questionnaire game ("quiz").

Once the personalized interactive content has been played, said artificial intelligence goes (arrow 111) into an end phase 112 where either a personalized interactive content is immediately chosen by another audience member (with return to phase 110), or said artificial intelligence goes back (arrow 113) to the second phase 105 if the criterion $R_4$ is below the aforementioned threshold $D_n$ but over a threshold $D_0$, or said artificial intelligence returns to the neutral state 100 if the criterion $R_4$ is below the threshold $D_0$.

It will be understood that because of the aforementioned capacities of the artificial intelligence of the local supervisory system formed by the supervisory modules 7c of the local digital display assembly E, it can process locally all the situations which come up, therefore very quickly, without consuming telecommunication bandwidth and without the latency which would be introduced by automatic processing on distant "on premises" infrastructure or on a cloud infrastructure (cloud IaaS).

In a particular embodiment, the machine learning module 4a can comprise a linguistic model which is adapted for learning from multimodal interactions of the system (voice, captured for example by microphones belonging to the digital display devices 2 or others, text, coming in particular from social networks, detectors 12, external conditions, etc.) for predicting:

on the interacting digital display: new phrases to display or new interactions for extending the crowd interaction mode; and on the displays close to the interacting digital display: new advertisements to be displayed, targeted to the specific audience with which the interaction is being done.

This learning can be done by transfer learning at three levels:
1. Pre-learning (2 neural layers for text and voice) of the linguistic model on a general corpus of text and voice data, done for example at regular intervals and spaces, for example once per month;
2. Fine learning of the linguistic model (1 neural layer) on specific tasks, for example for each specific campaign and/or for a specific day and hour;
3. Refinement of a context classifier (2 neural layers) for targeted tasks, where this classifier is next downloaded towards the or each affected local assembly E.

The different learning steps (neuro-lingual and classification) may be carried out on a cloud infrastructure (IaaS) with specialized components (powerful CPUs, GPU, RAM, etc.).

The classifier in question can constitute at least partially the aforementioned neural network distributed over the supervisory modules 7c or constitute a supplemental neural network executed on a local server ("edge server", not shown) operating for example in local area network with the supervisory modules 7c of the local assembly E.

Figure 6:
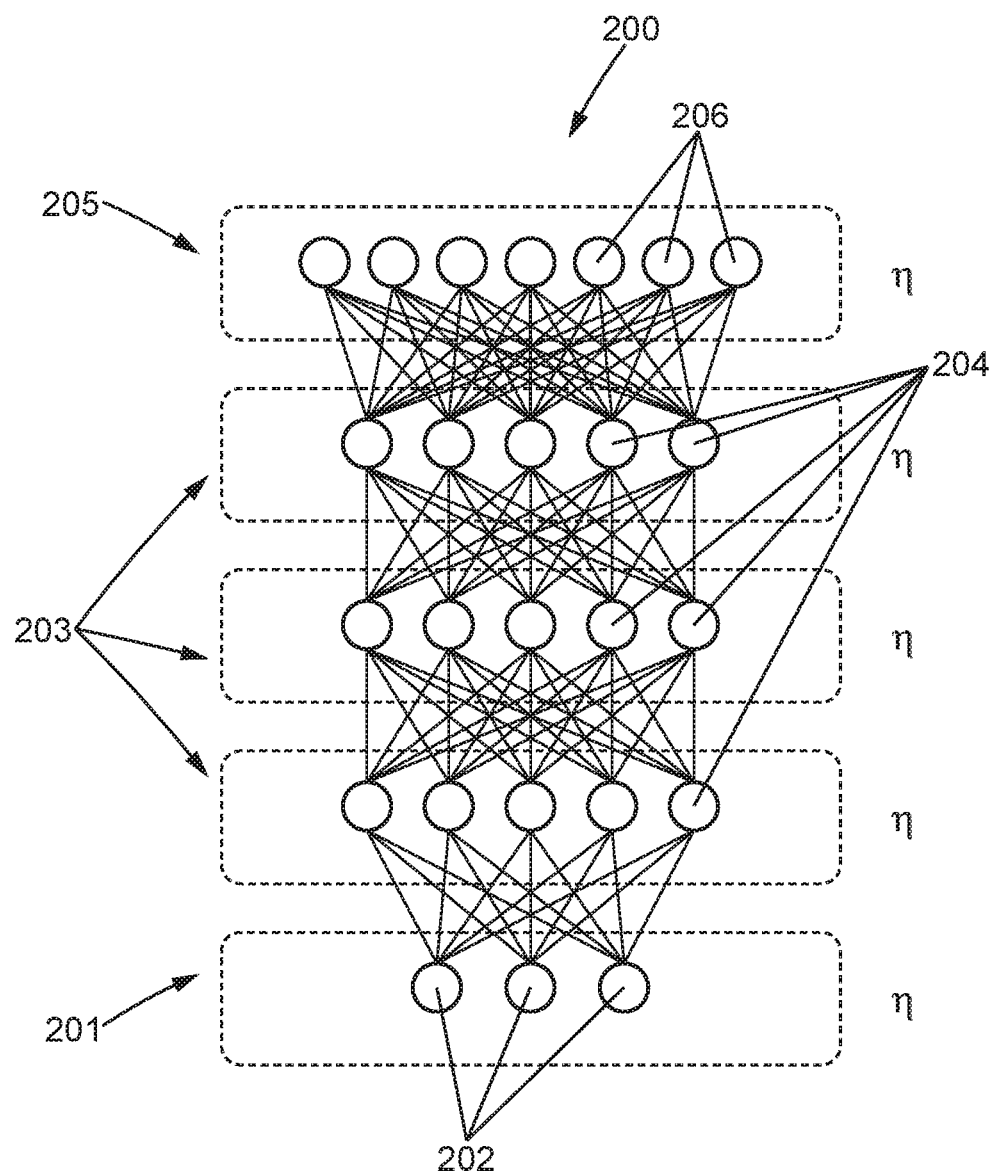
FIGS. 6 to 8 illustrate three levels of training of a neural network usable in the digital content broadcast network of the present description.
Figure 7:
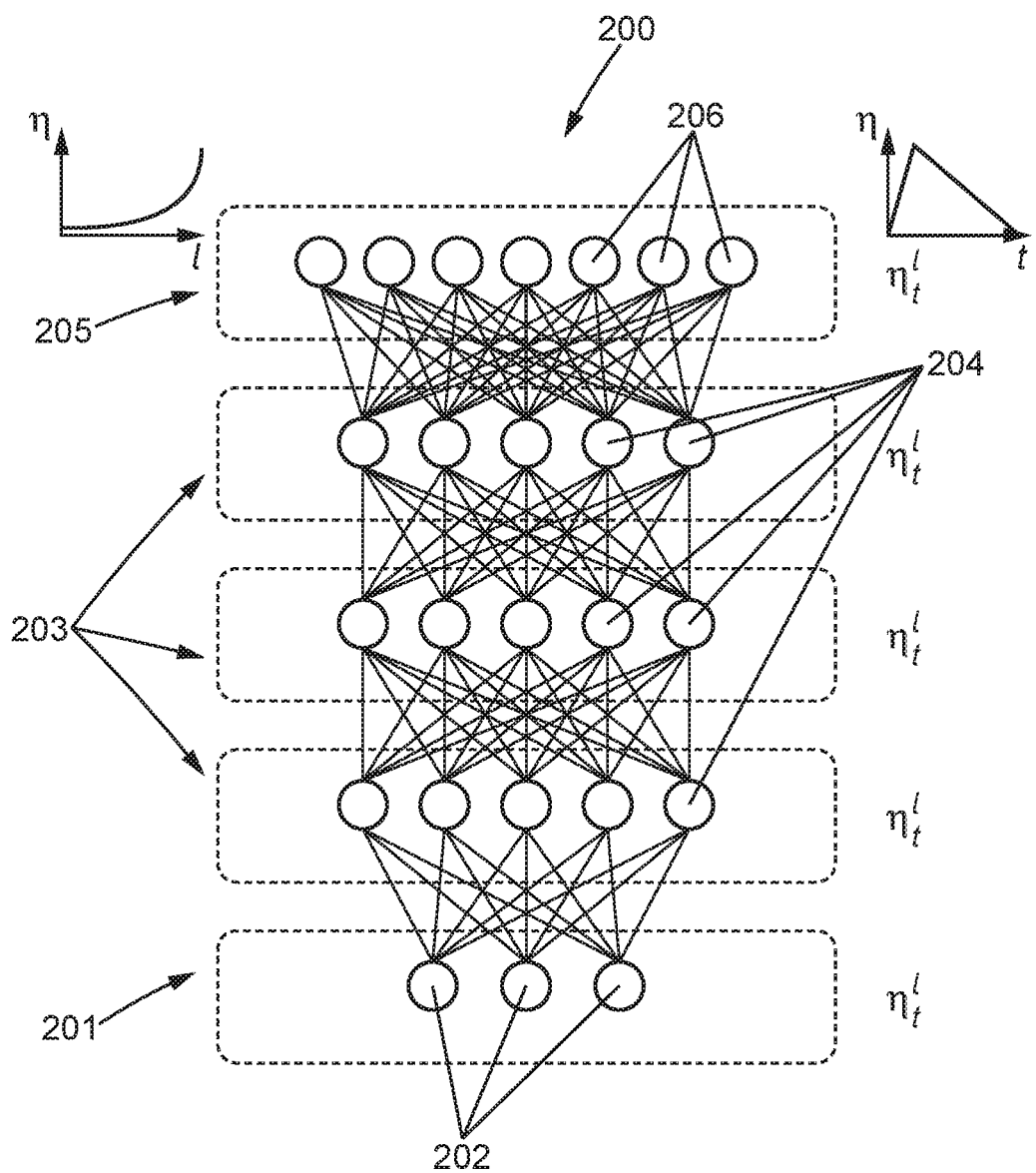
Figure 8:
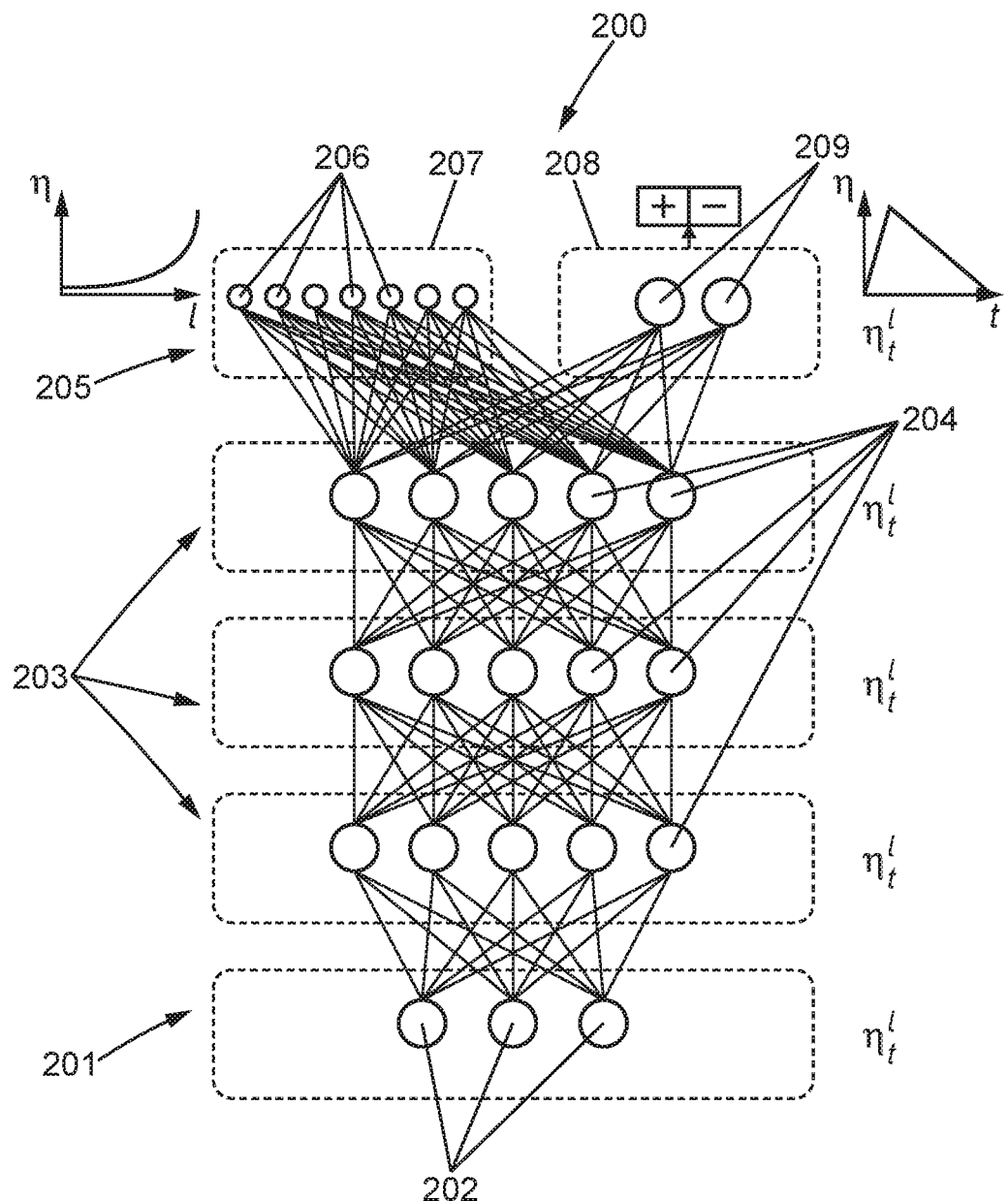

Each of these learning levels can be realized by a deep neural network, for example a five-layer neural network, as shown on FIGS. 6-8 respectively during the three training levels. The deep neural network 200 may have for instance one input layer 201 having input nodes, three superposed layers 203 of sigmoid neurons 204 and one output layer 205 having output nodes 206. After the $3^{rd}$ training level, the output layer 205 of the neural network 200 includes not only the assemble 207 of the above-mentioned output nodes 206, but also an assemble 208 of two output nodes 209 of classifier.

The learning for level 2 can be done by discriminant learning, for capturing various types of information in each neural network layer and by triangular learning (STLR, Slanted Triangular Learning Rate) with an accelerated learning rate, the latter to help a quick learning based on a very small training population/corpus (20 to 50 samples for the specialized training as explained below).

Learning for level 3 may comprise a gradual unfreezing of neural layers per epoch after each learning epoch. This is useful for the specialized progressive learning by each layer, for instance:

Training of the $1^{st}$ layer: longer generic learning epoch based for instance on «Generalized Text corpus Wikitext-103»;

Training of the $2^{nd}$ layer: rather long learning epoch on text utterances to learn used keywords, based for instance on «Voice corpus Microsoft Speech Language Translation (MSLT)»;

Training of the 3rd layer: specialized learning based on combination of text, voice and signals/events gathered by sensors (event-based sensor data, hashtags, tokens, flags). The training samples with this combination are relatively rare to find and thus imply a specialized training based on few samples (20 to 50 samples for the different specific cases);

Training of the classifier—$4^{th}$ and $5^{th}$ layers: «Sentiment analysis dataset Yelp full»+«Question completion: TREC-6». Training oriented by a knowledge graph to learn intelligent and contextual combinations of text, voice and signals/events gathered by sensors (event-based sensor data, hashtags, tokens, flags) in order to classify interesting behaviors of the audience to be targeted during broadcasting of a campaign.

The training of the different layers and the creation and refining of the knowledge graph for the classifier may be done on the cloud (cloud IaaS). After complete training of the different aforementioned layers, a form of compact and compressed neural network with well set-up parameters, will be downloaded on said local display assembly for independent edge operation, in particular intelligent broadcasting of advertisement targeted on the audience in front of said local display assembly, as well as for interacting with the audience as explained above.

The invention claimed is:

1. A local digital display assembly comprising several digital display devices located near each other, intended to be seen by members of the public, and each comprising at least one digital screen and one central unit comprising a screen control module able to have the digital screen display digital content, wherein said local digital display assembly further comprises devices for audience detection able to gather information about people located near the digital display devices,
wherein the local digital display assembly further comprises a local supervisory system suited for:
based on collected information, determining in real time at least one crowd characteristic representative of a collective behavior of the people located near the digital display devices, where said at least one crowd characteristic is chosen among a crowd density and a crowd movement speed; and
controlling the respective screen control modules of the digital display devices depending on said at least one crowd characteristic, where said local supervisory system is able to determine in real time the digital content to have respectively the digital display devices display depending on said at least one measured crowd characteristic;
wherein the local supervisory system comprises supervisory modules belonging respectively to the central units of several display devices of the digital display assembly, where the supervisory modules communicate with each other by a peer to peer communication protocol;
and where said local supervisory system comprises artificial intelligence distributed over said supervisory modules, which is able to determine said at least one crowd characteristic by a calculation distributed among said supervisory modules by the peer to peer communication.

2. The local digital display assembly according to claim 1, wherein said local supervisory system is able to determine several crowd characteristics including the crowd density, the crowd movement speed, a crowd movement direction and a proximity of the crowd to at least one of the digital display devices.

3. The local digital display assembly according to claim 1, wherein said local supervisory system is able to receive external data from at least one remote resource and for controlling the respective screen control modules of display devices depending on said external data.

4. The local digital display assembly according to claim 3, wherein said external data comprise meteorological data.

5. The local digital display assembly according to claim 3, wherein said external data comprise mobile phone data provided by mobile phone operators on the location and use of mobile terminals.

6. The local digital display assembly according to claim 3, wherein said external data comprise geolocalized data coming from social networks.

7. The local digital display assembly according to claim 1, wherein said audience detection device comprises at least one detector chosen among a camera, WiFi interface, NFC interface, Bluetooth® interface, radar detector, and passage detector.

8. The local digital display assembly according to claim 7, wherein said camera is chosen among a motion detection camera, a 360° camera and a 3D camera.

9. The local digital display assembly according to claim, 1 wherein at least one of the digital display devices comprises an input interface with which a member of the public can control said digital display device.

10. The local digital display assembly according to claim 9, wherein said input interface is chosen among a touch interface and a radio communication interface allowing an interaction with a mobile phone used by said member of the public.

11. The local digital display assembly according to claim 1, wherein each digital display device is able to operate:
either in normal mode where said digital display device displays digital content chosen among a first group of content;
or in a crowd interaction mode where said digital display device displays at least one digital content chosen among a second group of preemptive content;
said local supervisory system is able to have at least one of the digital display devices from the local digital display assembly operate in crowd interaction mode when a crowd is identified.

12. The local digital display assembly according to claim 11, wherein the local supervisory system is able to determine in real time at least the crowd density, and the local supervisory system is able to have at least one of the digital display devices operate in crowd interaction mode when the local supervisory system detects a crowd density over a minimum density in the area of said at least one digital display after a period of operation in normal mode.

13. The local digital display assembly according to claim 12, wherein said local supervisory system is farther able to determine in real time at least the crowd speed, and the local supervisory system is able to have at least one of the digital display devices operate in crowd interaction mode when the local supervisory system detects a crowd density over a minimum density and a crowd speed under a maximum speed in the area of said at least one digital display after a period of operation in normal mode.

14. The local digital display assembly according to claim 13, wherein the local supervisory system is able to return all digital display devices of said local digital display assembly to operation in normal mode when the crowd moves farther than a maximum distance away from each digital display device of said local digital display assembly after a time operating in crowd interaction mode.

15. The local digital display assembly according to claim 12, wherein the local supervisory system is further suited for determining in real time at least a proximity of the crowd relative to each digital display device in the local digital display assembly, and the local supervisory system is able to determine, in said local digital display assembly, at least one digital display device closest to the crowd and to have said at least one digital display device closest to the crowd operate in crowd interaction mode.

16. The local digital display assembly according to claim 15, wherein said local supervisory system is able, depending on said crowd movement direction and said proximity of the crowd to each digital display device from the local digital display assembly:
to determine, in said local digital display assembly, at least one digital display device best able to draw the crowd in a desired direction;
and to have said digital display device operate in crowd interaction mode.

17. The local digital display assembly according to claim 11, wherein when the local supervisory system makes at least one of the digital display devices operate in crowd interaction mode, said local supervisory system continuously analyzes the behavior of the audience and goes through several successive predetermined phases depending on said behavior of the audience for progressively increasing the influence thereof on the crowd.

18. The local digital display assembly according to claim 17, wherein said local supervisory system is able:
when the local supervisory system goes into crowd interaction mode, to go into a first phase in which said local supervisory system has geolocalized data coming from social networks corresponding to a location of said local digital display assembly displayed on said at least one digital display device.

19. The local digital display assembly according to claim 18, wherein said local supervisory system is able:
when the local supervisory system is in the first phase of crowd interaction mode, to determine whether the audience satisfies at least one audience targeting criterion indicating that the audience is targeted and in the affirmative, to go into a second phase in which said local supervisory system has targeted content corresponding to the audience displayed on said at least one digital display device.

20. The local digital display assembly according to claim 19, wherein said local supervisory system is able:
when the local supervisory system is in the second phase of crowd interaction mode, to determine whether the audience satisfies at least one interactive criterion indicating that the audience is ready to interact with at least one digital display device and in the affirmative, to go into a third phase in which said local supervisory system has at least one simple interactive content displayed on said at least one digital display device.

21. The local digital display assembly according to claim 20, wherein, said local supervisory system is able:
when the local supervisory system is in the third phase of crowd interaction mode, to determine whether the audience satisfies at least one domination criterion indicating that the audience is ready to let itself be directed by at least one digital display device and in the affirmative, to go into a fourth phase in which said local supervisory system has at least one personalized interactive content chosen by the at least one audience member displayed on said at least one digital display device.

22. The local digital display assembly according to claim 20, wherein said local supervisory system is able:
when the local supervisory system is in the third phase or in the fourth phase of the crowd interaction mode to have at least one other of the digital display devices display said targeted content as defined in claim 19.

23. The digital content broadcast network according to claim 1, wherein said artificial intelligence distributed over the supervisory modules comprises at least one neural network.

24. The digital content broadcast network according to claim 23, wherein said at least neural network is at least one compressed deep neural network.

25. A digital content broadcast network comprising at least one first local digital display assembly according to claim 14 and one second local digital display assembly according to claim 15, where the local supervisory systems of the first and second local digital display assemblies communicate with each other and are able to:
when the local supervisory system of the first local digital display assembly returns all the digital display devices of said first local digital display assembly to operation in normal mode and detects that the crowd is moving towards the second local digital display assembly, to determine a digital display device within the second local digital display assembly best able to capture the attention of the crowd and/or to draw in the crowd;
and to have said digital display device of the second local digital display assembly operate in crowd interaction mode.

26. A digital content broadcast network comprising at least one local digital display assembly according to claim 1 and at least one remote server, wherein the local supervisory system of the local digital display assembly comprises artificial intelligence suited for at least determining in real time the digital content to have respectively the digital display devices display depending on said at least one measured crowd characteristic, where the local supervisory system of said local digital display assembly is able to communicate to said at least one remote server information about the operation in crowd interaction mode of said local digital display assembly, and where said at least one remote server comprises at least one machine learning module able to enrich the artificial intelligence of the local supervisory system depending on said information about the operation in crowd interaction mode from said local digital display assembly.

27. The digital content broadcast network according to claim 26, wherein the artificial intelligence of the local supervisory system comprises a set of heuristic rules and said at least one remote server is able to improve said set of heuristic rules by adapting the pre-existing heuristic rules and/or by creating new heuristic rules added to said heuristic rules set.

* * * * *